US008804884B2

(12) United States Patent
Maltsev et al.

(10) Patent No.: US 8,804,884 B2
(45) Date of Patent: Aug. 12, 2014

(54) METHOD AND APPARATUS FOR SUPPRESSING CO-CHANNEL INTERFERENCE

(75) Inventors: Alexander Alexandrovich Maltsev, Nizhny Novgorod (RU); Andrey Vyacheslavovich Pudeyev, Nizhny Novgorod (RU); Alexei Vladimirovich Davydov, Nizhny Novgorod (RU); Sergey Alexanderovich Tiraspolsky, Nizhny Novgorod (RU); Alexey Evgenievich Rubtsov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1311 days.

(21) Appl. No.: 12/278,368

(22) PCT Filed: Feb. 6, 2006

(86) PCT No.: PCT/RU2006/000045
§ 371 (c)(1),
(2), (4) Date: Aug. 27, 2009

(87) PCT Pub. No.: WO2007/091908
PCT Pub. Date: Aug. 16, 2007

(65) Prior Publication Data
US 2010/0150079 A1  Jun. 17, 2010

(51) Int. Cl.
*H04L 1/02* (2006.01)
(52) U.S. Cl.
USPC ........................................................ 375/347
(58) Field of Classification Search
USPC ......... 370/206, 210, 310, 329, 334, 342, 343, 370/344, 478, 331, 341; 475/219, 260, 340, 475/346, 347, 350; 455/450, 452.2, 561; 375/219, 260, 340, 346, 347, 350
See application file for complete search history.

(56) References Cited

U.S. PATENT DOCUMENTS

| 8,428,158 B2 | 4/2013 | Maltsev et al. |
| 2002/0105928 A1 | 8/2002 | Kapoor et al. |
| 2002/0150065 A1* | 10/2002 | Ponnekanti ................... 370/334 |
| 2004/0176097 A1* | 9/2004 | Wilson et al. ............... 455/452.2 |
| 2004/0218702 A1* | 11/2004 | Denk ............................. 375/350 |
| 2005/0135324 A1* | 6/2005 | Kim et al. ..................... 370/343 |
| 2005/0277425 A1 | 12/2005 | Niemela et al. |

(Continued)

FOREIGN PATENT DOCUMENTS

WO  WO-2007091908 A1  8/2007

OTHER PUBLICATIONS

"U.S. Appl. No. 12/281,049, Response filed Sep. 28, 2012 to Non Final Office Action Jul. 3, 2012", 13 pgs.

(Continued)

*Primary Examiner* — Sam K Ahn
*Assistant Examiner* — Shawkat M Ali
(74) *Attorney, Agent, or Firm* — Schwegman, Lundberg & Woessner, P.A.

(57) ABSTRACT

System and method for interference reduction in a broadband wireless access (BWA) network are disclosed. A mobile station performs a recursive process to update channel estimates of interfering channels on a symbol-by-symbol basis for use in canceling interference from data subcarriers received through two or more antennas.

21 Claims, 6 Drawing Sheets

(56) References Cited

U.S. PATENT DOCUMENTS

| | | |
|---|---|---|
| 2006/0013340 A1 | 1/2006 | Reid |
| 2006/0019694 A1* | 1/2006 | Sutivong et al. ............. 455/522 |
| 2006/0092875 A1* | 5/2006 | Yang et al. .................... 370/329 |
| 2012/0281676 A1* | 11/2012 | Ma et al. ....................... 370/331 |

OTHER PUBLICATIONS

"U.S. Appl. No. 12/281,049, Examiner Interview Summary mailed Dec. 6, 2012", 2 pgs.

"U.S. Appl. No. 12/281,049, Notice of Allowance mailed Dec. 28, 2012", 12 pgs.

* cited by examiner

METHOD AND APPARATUS FOR SUPPRESSING CO-CHANNEL INTERFERENCE

This application is a U.S. National Stage Filing under 35 9U.S.C. 371 from International Application No. PCT/RU2006/000045, filed Feb. 6, 2006 and published in English as WO 2007/091908 on Aug. 16, 2007, which application and publication is incorporated herein by reference in their entireties.

TECHNICAL FIELD

Some embodiments of the present invention pertain to wireless communication systems. Some embodiments of the present invention pertain to wireless networks such as broadband wireless access (BWA) networks.

BACKGROUND

A mobile unit's ability to receive and process signals from a serving base station may be affected by interfering signals, particularly interfering signals from other base stations that use the same frequency subcarriers. In the case of BWA, networks, base stations of different BWA networks may be synchronized and may concurrently transmit downlink frames to their associated mobile stations using the same subcarriers of a multiplexing scheme such as orthogonal frequency division multiple access (OFDMA). This makes it difficult for a mobile unit operating in the presence of interfering base stations to receive and process signals from a serving base station.

Thus, there are general needs for mobile stations that can operate in the presence of interfering base stations and methods for reducing interference.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1A:
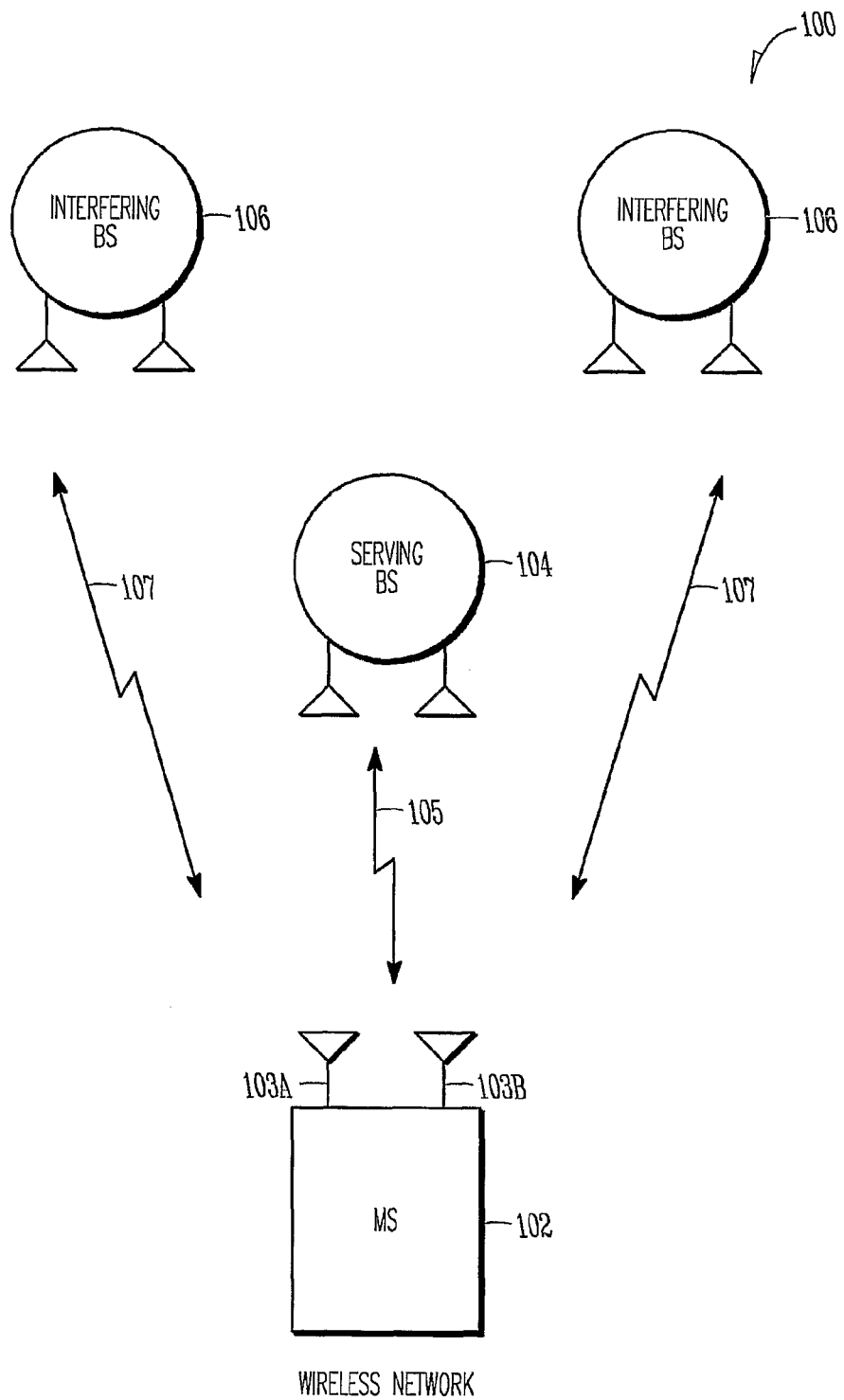
FIG. 1A illustrates a wireless network in accordance with some embodiments of the present invention.

FIG. 1A illustrates a wireless network in accordance with some embodiments of the present invention. Wireless network 100 includes mobile station (MS) 102, serving base station (BS) 104 and one or more interfering base stations (BS) 106. Interfering base stations 106 and serving base station 104 may be neighboring base stations. Mobile station 102 and serving base station 104 communicate over main channel 105. Interfering base stations 106 may communicate with other mobile stations (not illustrated) within the same frequency spectrum used by mobile station 102 and serving base station 104. Serving base station 104 and interfering base stations 106 may use the same set of subcarriers for their communications. Interfering signals from interfering base stations 106 may be received by mobile station 102 through interfering channels 107.

In accordance with some embodiments of the present invention, mobile station 102 may receive signals through two or more antennas, illustrated generally as antennas 103A and 103B. In these embodiments, mobile station 102 may significantly decrease, and even substantially cancel, the interference from one or more interfering base stations 106 by applying appropriate weights to the signals received through antennas 103A and 103B. In some embodiments, mobile station 102 performs a recursive filtering process to generate and update channel estimates for main channel 105 and one or more interfering channels 107 on a symbol-by-symbol basis for use in generating the weights.

In some embodiments, mobile station 102 may identify interfering base stations 106 that are considered to be significant interferers based on an identifier in a preamble symbol. In some embodiments, mobile station 102 may generate the subcarrier modulation sequence used by interfering base stations 106 identified to be significant interferers.

In some embodiments, mobile station 102 may use a recursive filtering process to recursively generate and update channel estimates for main channel 105 and interfering channels 107 on a symbol-by-symbol basis for each pilot subcarrier using pilot subcarrier modulation sequences for both serving base station 102 and interfering base stations 106. In some embodiments, channel estimates for main channel 105 and interfering channels 107 may be generated for each of antennas 103A and 103B. In some embodiments, the recursive filtering process may also use the signals received on the pilot subcarriers through each of antennas 103A and 103B to recursively generate and update the channel estimates for each data symbol of an OFDMA frame.

In some embodiments, mobile station 102 may calculate an interference correlation matrix on a symbol-by-symbol basis for each pilot subcarrier from the channel estimates for main channel 105 and the channel estimates for interfering channels 107. In some embodiments, mobile station 102 may also calculate weights on a symbol-by-symbol basis for each pilot subcarrier for each of antennas 103A and 103B based on the interference correlation matrix and the channel estimate for main channel 105. In some embodiments, mobile station 102 may interpolate the weights for each pilot subcarrier for each of antennas 103A and 103B to generate weights for each data subcarrier for each of antennas 103A and 103B. These embodiments are described in more detail below.

Figure 1B:
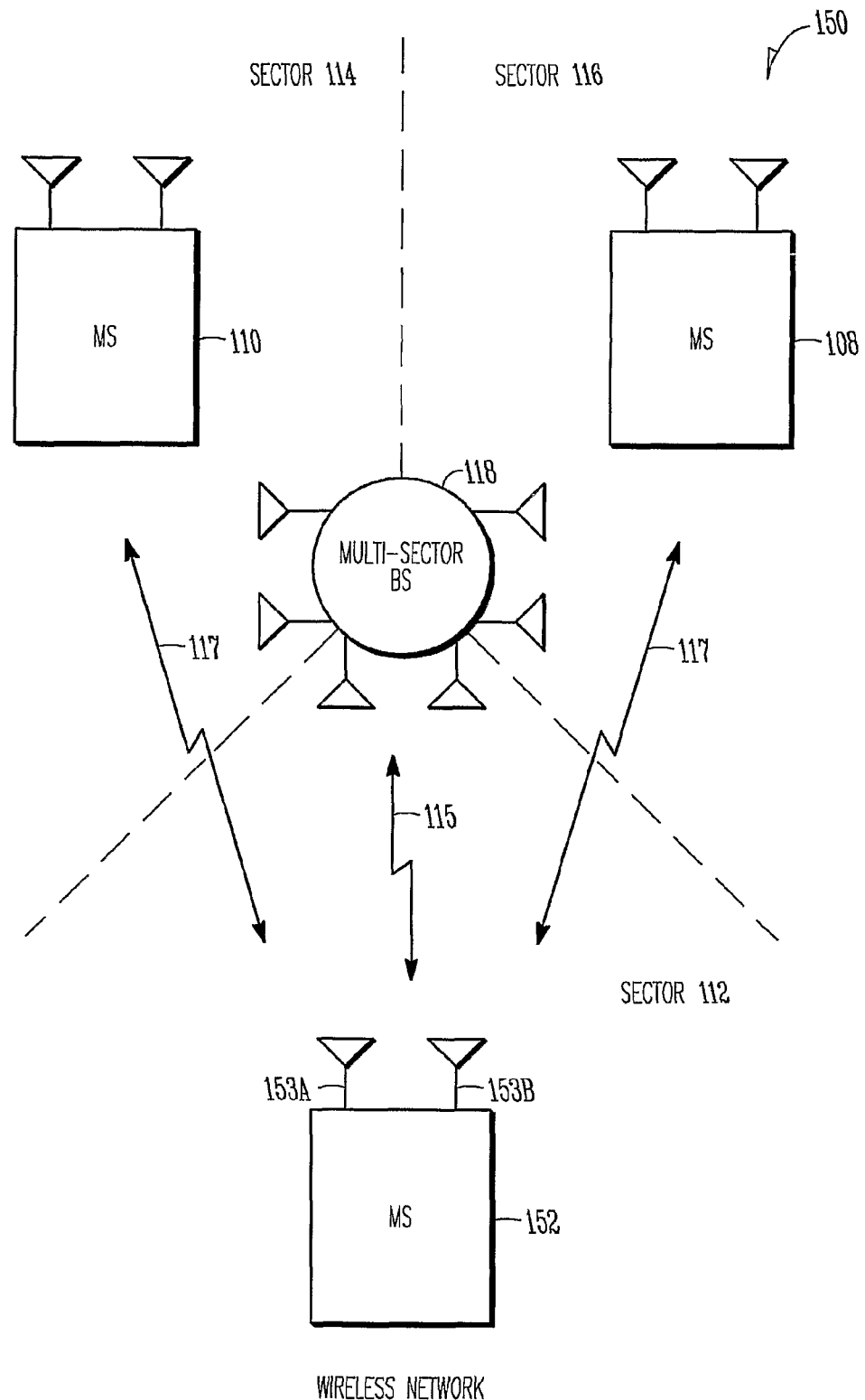
FIG. 1B illustrates a wireless network with a multi-sector base station in accordance with some embodiments of the present invention.

FIG. 1B illustrates a wireless network with a multi-sector base station in accordance with some embodiments of the present invention. Wireless network 150 includes multi-sector base station 118 and a plurality of mobile stations, illustrated generally as mobile stations 108, 110 and 152. Multi-sector base station 118 provides wireless network communications within a plurality of sectors, such as sectors 112, 114 and 116, using the same frequency spectrum, and in some embodiments, using the same set of subcarriers. In these embodiments, multi-sector base station 118 communicates with mobile station 152 over main channel 115 in sector 112; multi-sector base station 118 communicates with mobile station 108 in sector 116; and multi-sector base station 118 communicates with mobile station 110 in sector 114.

In some of these embodiments, preamble symbols of frames transmitted to mobile stations of different sectors may use different sets of subcarriers, while the data portions of the frames may use the same subcarriers. In some multi-sector embodiments, multi-sector base station 118 may use one of three orthogonal sets of subcarriers for transmitting the preamble symbol within each sector. In these embodiments, a base station may use every third subcarrier for transmitting a preamble symbol in a particular sector, although the scope of the invention is not limited in this respect.

In accordance with some embodiments of the present invention mobile station 152 may significantly decrease, and even substantially cancel, the interference from the communications within other sectors by applying appropriate weights to the signals received through antennas 153A and 153B. In some embodiments, mobile station 152 performs a recursive filtering process to estimate and/or update channel estimates for main channel 115 and one or more interfering channels 117 on a symbol-by-symbol basis for use in generating the weights. These embodiments are discussed in more detail below.

Figure 2:
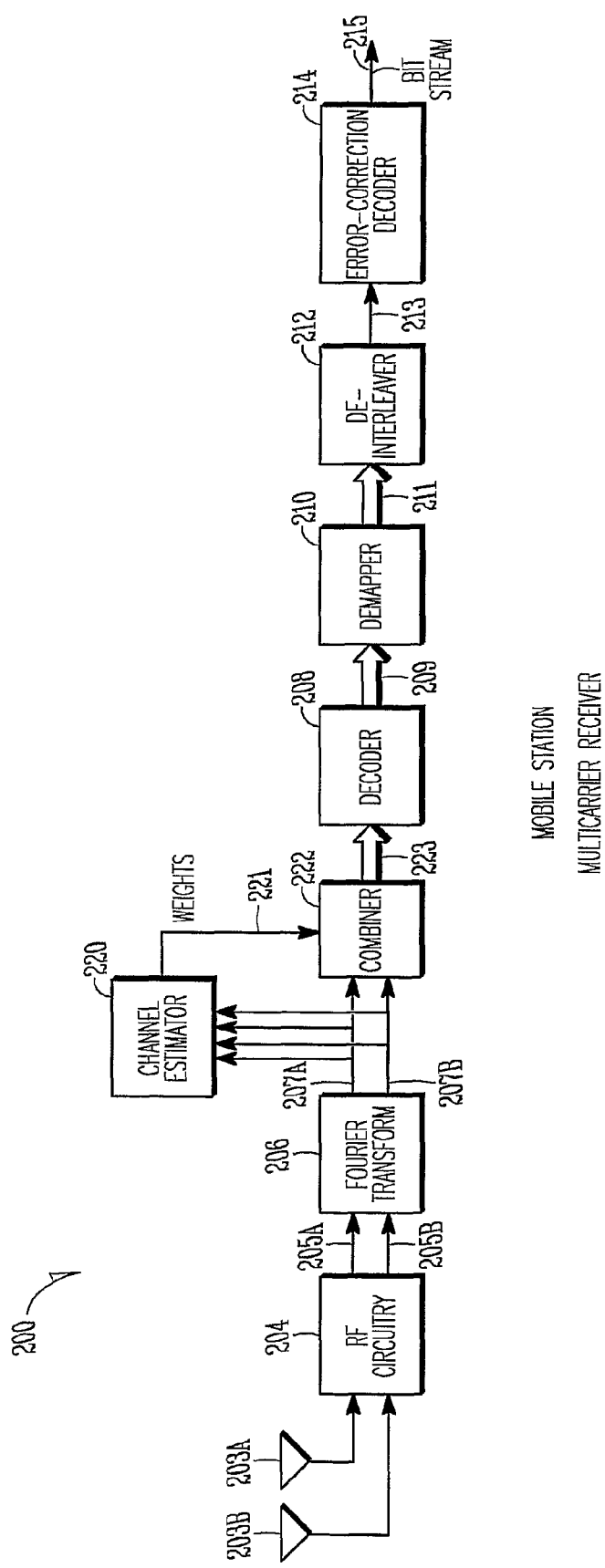
FIG. 2 is a functional block diagram of a mobile station multicarrier receiver in accordance with some embodiments of the present invention.

FIG. 2 is a functional block diagram of a mobile station multicarrier receiver in accordance with some embodiments of the present invention. Mobile station multicarrier receiver 200 may be suitable for use as a receiver portion of mobile station 102 (FIG. 1A) and/or a receiver portion of mobile station 152 (FIG. 1B), although other receiver configurations may also be suitable.

Mobile station multicarrier receiver 200 may include two or more antennas, such as antennas 203A and 203B, to receive signals. Mobile station multicarrier receiver 200 may also include radio-frequency (RF) circuitry 204 to downconvert and digitize the received signals. RF circuitry 204 may generate digital time-domain signals 205A from antenna 203A and may generate digital time-domain signals 205B from antenna 203B. Antennas 203A and 203B may correspond respectively to antennas 103A and 103B (FIG. 1A) of mobile station 102 (FIG. 1A) and may correspond respectively to antennas 153A and 153B (FIG. 1B) of mobile station 152 (FIG. 1B).

Mobile station multicarrier receiver 200 may also include Fourier transform circuitry 206 to perform a Fourier transform on digital time-domain signals 205A to generate frequency-domain (FD) signals 207A and to perform a Fourier transform on digital time-domain signals 205B to generate frequency-domain signals 207B. In some embodiments, Fourier transform circuitry 206 may provide a set of frequency-domain signals for each antenna. In some embodiments, for each antenna, Fourier transform circuitry 206 may provide a frequency-domain signal for each subcarrier of a received multicarrier communication signal. In some embodiments, Fourier transform circuitry 206 may perform a discrete Fourier transform (DFT), such as a fast Fourier transform, although the scope of the invention is not limited in this respect.

Mobile station multicarrier receiver 200 may also include channel estimator 220 to generate data-subcarrier weights 221 for each data subcarrier based on frequency-domain signals 207A and 207B. Mobile station multicarrier receiver 200 may also include combiner 222 to combine and weight corresponding subcarriers of frequency-domain signals 207A and 207B to generate output frequency-domain signals 223 for each subcarrier. In accordance with some embodiments, the application of data-subcarrier weights 221 by combiner 222 may suppress most significant interferers, particularly the transmissions from interfering base stations or sectors discussed above. The generation and application of weights by channel estimator 220 is discussed in more detail below. In some embodiments, output frequency-domain signals 223 may comprise a sub-symbol for each data subcarrier. In these embodiments, combiner 222 may generate a single frequency-domain signal for each data subcarrier from frequency-domain signals 207A and 207B associated with antennas 203A and 203B, respectively.

Mobile station multicarrier receiver 200 may also include decoder 208 to decode output frequency-domain signals 223 and generate decoded subsymbols 209. In some embodiments, subsymbols 209 may comprise one or more quadrature-amplitude modulation (QAM) symbols for each subcarrier.

Mobile station multicarrier receiver 200 may also include demapper 210 to demap decoded subsymbols 209 and to generate one or more bits 211 for each data subcarrier. In some embodiments, demapper 210 may be a QAM demapper to demap the QAM symbols based on a subcarrier modulation level, although the scope of the invention is not limited in this respect.

Mobile station multicarrier receiver 200 may also include deinterleaver 212 to perform a deinterleaving operation on bits 211 to generate deinterleaved bits 213. In some embodiments, deinterleaver 212 may perform a block deinterleaving operation on blocks of bits, although the scope of the invention is not limited in this respect.

Mobile station multicarrier receiver 200 may also include error-correction decoder 214 to perform an error-correction decoding operation on bits 213 to generate decoded bit stream 215. In some embodiments, error-correction decoder 214 may perform a forward-error correction (FEC) decoding operation on bits 213, although the scope of the invention is not limited in this respect. In some embodiments, error-correction decoder 214 may perform a convolutional decoding operation on bits 213, although the scope of the invention is not limited in this respect.

Although mobile station multicarrier receiver 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of mobile station multicarrier receiver 200 may refer to one or more processes operating on one or more processing elements.

In some embodiments, mobile station multicarrier receiver 200 may be part of a wireless communication device that may transmit and receive orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. Each subcarrier of the OFDM signals may have a null at substantially the center frequency of the other subcarriers and/or each subcarrier may have an integer number of cycles within a symbol period, although the scope of the invention is not limited in this respect. In some other embodiments, mobile station multicarrier receiver 200 may communicate using spread-spectrum signals. In some embodiments, the frequency spectrums for the multicarrier communication signals may comprise frequencies between 2 and 11 GHz, although the scope of the invention is not limited in this respect.

In some embodiments, mobile station multicarrier receiver 200 may be part of a broadband communication station that may operate within a broadband wireless access (BWA) network, such as a Worldwide Interoperability for Microwave Access (WiMax) network, although the scope of the invention is not limited in this respect. In some embodiments, mobile station multicarrier receiver 200 may communicate in accordance with the IEEE 802.16-2004 and/or IEEE 802.16 (e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some embodiments, mobile station multicarrier receiver 200 may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television, medical devices (e.g., a heart rate monitor, a blood pressure monitor, etc.), or other device that may receive and/or transmit information wirelessly.

Antennas 203A and 203B may comprise two or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some embodiments, antennas 203A and 203B may be effectively separated to take advantage of spatial diversity and the different channel characteristics that may result between each of antennas 203A and 203B and the base station. In some embodiments, antennas 203A and 203B may be separated by up to 1/10 of a wavelength or more, although the scope of the invention is not limited in this respect.

Figure 3:
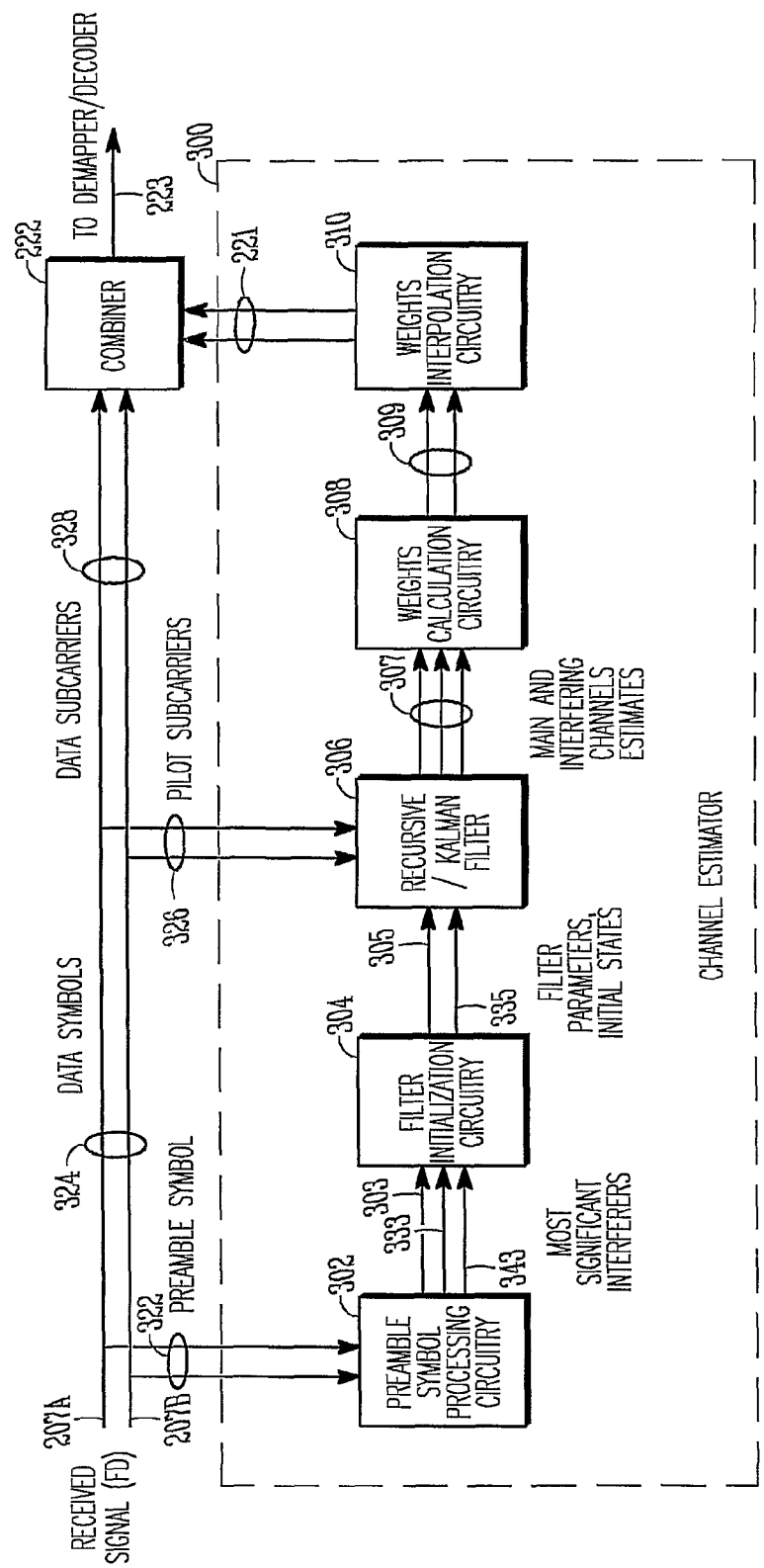
FIG. 3 is a block diagram of a channel estimator in accordance with some embodiments of the present invention.

FIG. 3 is a block diagram of a channel estimator in accordance with some embodiments of the present invention. Channel estimator 300 may be suitable for use as channel estimator 220 (FIG. 2), although other channel estimator configurations may also be suitable. Channel estimator 300 generates data-subcarrier weights 221 from preamble symbol 322 of a received downlink frame and pilot subcarriers 326 of subsequently received data symbols of the downlink frame. Data-subcarrier weights 221 may be applied by combiner 222 for combining and weighing data subcarriers 328 of the subsequently received data symbols. In accordance with some embodiments, channel estimator 300 comprises preamble symbol processing circuitry 302, filter initialization circuitry 304, recursive/Kalman filter 306, weights calculation circuitry 308 and weights interpolation circuitry 310. As illustrated in FIG. 3, received signals 207A and 207B may be frequency domain (FD) signals that include preamble symbol 322 and data symbols 324. Data symbols 324 may include pilot subcarriers 326 and data subcarriers 328.

Preamble symbol processing circuitry 302 may identify one or more interfering base stations, such as interfering base stations 106 (FIG. 1A), from preamble symbol 322 and may extract seeds 303 from the preamble identifiers for use by filter initialization circuitry 304. Preamble symbol processing circuitry 302 may also generate initial channel estimate 333 for main channel 105 from preamble symbol 322. In some multi-sector embodiments, preamble symbol processing circuitry 302 may also generate initial channel estimate 343 for one or more interfering channels 115 (FIG. 1B) from preamble symbol 322 because the preamble symbols from different sectors may be transmitted by multi-sector base station 118 (FIG. 1B) on different subcarriers.

In some embodiments, preamble symbol 322 may be received through two or more antennas and preamble symbol processing circuitry 302 may combine (e.g., average or sum) the frequency-domain signals associated with each of the antennas. In some embodiments, preamble symbol processing circuitry 302 may perform frequency-domain matched filtering to separate preamble symbols transmitted by interfering base station 106 (FIG. 1A) from the preamble symbol transmitted by serving base station 104 (FIG. 1A), although the scope of the invention is not limited in this respect.

Filter initialization circuitry 304 may generate an initial state vector 305 for recursive filter 306. Filter initialization circuitry 304 may also generate pilot subcarrier modulation sequences 335 for the main and the interfering channels from extracted seeds 303. In some embodiments filter initialization circuitry 304 may select the orders (i.e., dimensions) for the recursive filter 306 based on a number of interfering base stations 106 (FIG. 1A) identified by preamble symbol processing circuitry 302. In some embodiments, filter initialization circuitry 304 may adaptively update the orders of recursive filter 306 when the number of interfering base stations 106 changes, although the scope of the invention is not limited in this respect. In some embodiments, the orders of recursive filter 306 may be adaptively redistributed based on the number, strength and/or importance of signals from interfering base stations 106 (FIG. 1A). For example, when a forth order recursive filter is selected, two orders may be allocated to main channel 105 (FIG. 1A), and one order may be allocated to each interfering channel 107 (FIG. 1A).

Recursive filter 306 may generate channel estimates 307 for the main channel and the interfering channels by performing a symbol-by-symbol recursive process using initial state vector 305, pilot subcarrier modulation sequences 335, and pilot subcarriers 326 of each data symbol received through each antenna. In some embodiments, recursive filter 306 may be a Kalman filter, although the scope of the invention is not limited in this respect. Some embodiments of the symbol-by-symbol recursive process are described in more detail below.

Weights calculation circuitry 308 may generate pilot-subcarrier weights 309 for each pilot subcarrier for each of antennas 203A and 203B (FIG. 2) based on channel estimates 307. Weights interpolation circuitry 310 may interpolate pilot-subcarrier weights 309 to generate data-subcarrier weights 221 (FIG. 2) for each data subcarrier 328 for each antenna. In some embodiments, weights calculation circuitry 308 may perform a linear interpolation to generate pilot-subcarrier weights 309. In some embodiments, weights calculation circuitry 308 may perform an optimal weight calculation. In these embodiments, pilot-subcarrier weights 309 may be calculated by weight calculation circuitry 308 to suppress the signals from the most significant of interfering base stations 106 (FIG. 1A). In some embodiments, weight calculation circuitry 308 may apply a zero-forcing (ZF) algorithm to calculate pilot-subcarrier weights 309, while in other embodiments, weight calculation circuitry 308 may apply a minimum mean squared error (MMSE) algorithm to calculate pilot-subcarrier weights 309, although the scope of the invention is not limited in these respects.

Although channel estimator 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of channel estimator 300 may refer to one or more processes operating on one or more processing elements.

Figure 4:
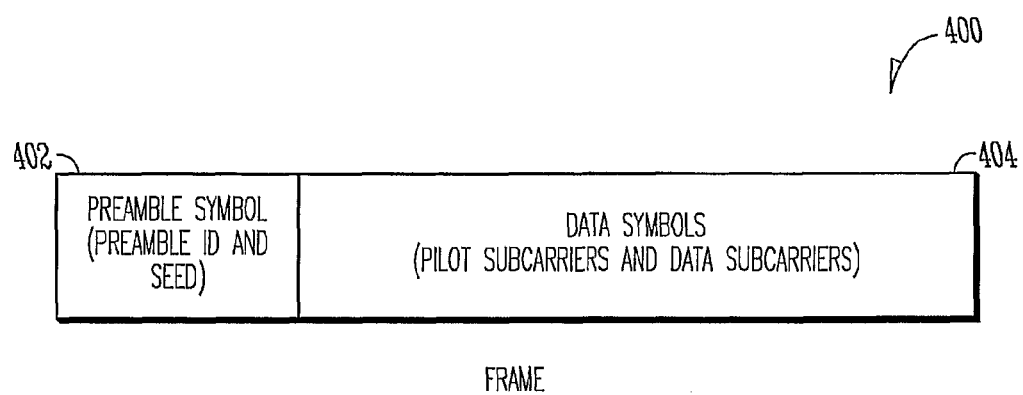
FIG. 4 illustrates a downlink frame in accordance with some embodiments of the present invention.

FIG. 4 illustrates a downlink frame in accordance with some embodiments of the present invention. Downlink frame 400 comprises preamble symbol 402 and one or more data symbols 404. Preamble symbol 402 may correspond to preamble symbol 322 (FIG. 3) and may include, among other things, a preamble identifier from each transmitting base station and an associated seed for generating the subcarrier modulation sequence for the associated base station. Data symbols 404 may comprise pilot subcarriers corresponding to pilot subcarriers 326 (FIG. 3) and data subcarriers corresponding to data subcarriers 328 (FIG. 3). In some embodiments, downlink frame 400 may be an OFDMA frame, and preamble symbol 402 and data symbols 404 may comprise OFDMA symbols. Although frame 400 is described as a downlink frame transmitted from a base station to a mobile station, the scope of the invention is not limited in this respect and may equally apply to uplink transmissions.

Referring to FIGS. 1A, 1B, 2, 3 and 4 together, some embodiments of the present invention may provide for interference mitigation in broadband wireless access systems, such as systems operating in accordance with the IEEE 802.16e standard. In some conventional broadband wireless access systems, one of the major causes of downlink performance degradation is a result of interference from neighboring base stations. In accordance with some embodiments of the present invention, mobile station 102 may significantly decrease and possibly even completely cancel the interference from neighboring base stations by applying weights to the signals received on different antennas 103A and 103B. In some embodiments, the weight-application technique discussed above may comprise optimal combining or adaptive interference cancellation. In some embodiments, zero forcing or minimum mean square error approaches may be used to calculate the antenna weights at each of the subcarriers, although the scope of the invention is not limited in this respect.

Some conventional interference cancellation algorithms require use of the interference correlation matrix at each subcarrier. Direct estimation of the interference correlation matrix at each subcarrier may be a difficult and computationally complex task. In accordance with some embodiments of the present invention, interference cancellation may be based on channel estimates of the interfering channels (e.g., channels 107 or channels 117) rather than a direct estimation of the interference correlation matrix.

Because neighboring base stations may operate synchronously, the pilot subcarriers of serving base station 104 may be affected by the pilot subcarriers of interfering base stations 106 because the pilot subcarriers of the neighboring base stations use the same frequency subcarriers. Each base station however, may modulate its pilot subcarriers with different pilot subcarrier modulation sequences. In some embodiments, the pilot subcarrier modulation sequences may comprise pseudo random binary sequences (PRBSs), although the scope of the invention is not limited in this respect. As discussed above, multi-sector base station 118 may modulate the pilot subcarriers used in each sector with different pilot subcarrier modulation sequences. In some embodiments, information about each pilot subcarrier modulation sequences may be determined from a special identifier which may be included in a frame header and/or from the preamble symbol using the preamble processing discussed above. For example, a preamble symbol of each base station may include a preamble identifier (ID) from which a seed may be extracted. The seed may be used to seed an algorithm to generate the particular subcarrier modulation sequence used by the base station that transmitted the preamble symbol. The pilot subcarrier modulation sequence of serving base station 104 may be used for channel estimation of main channel 105 by mobile station 102. In accordance with some embodiments, the pilot subcarrier modulation sequences of interfering base stations 106 may be used by channel estimator 220 to calculate an interference correlation matrix through estimating the interfering channels for the purpose of further interference cancellation.

In accordance with some embodiments, the received signal at a particular pilot subcarrier may be expressed as:

$$x_r(k) = H_m(k)p_m(k) + \sum_{i=1}^{N_{int}} H_i(k)p_i(k) + n(k) \quad (1)$$

where $x_r(k)$ is a received signal vector of size $1 \times N_{int}$ at all receiving antennas at the $k^{th}$ symbol, $p_m(k)$ represents the pilot values for serving base station 102, $p_i(k)$ represents the pilot values for interfering base stations 106, and $n(k)$ is residual noise which may be modeled as additive white Gaussian noise (AWGN). The residual noise may include background receiver noise and weak interferers. In Equation (1), $H_m$ is a vector representing the channel transfer function for main channel 105, and $H_i$ ($i=1 \ldots N_{int}$) is a vector representing the channel transfer functions for interfering channels 107 from interfering base stations 106 to mobile station 102. $N_{int}$ represents the number of interfering base stations 106 that are determined to be significant interferers by preamble symbol processing circuitry 302.

In accordance with some embodiments, a state-space dynamic model of the channel transfer function may be used and recursive filtering, such as Kalman filtering, may be applied to estimate main channel 105 and interfering channels 107 simultaneously. The recursive filtering performed by recursive filter 306 may perform matrix processing operations at each step. These matrix processing operations are generally more computationally intensive for higher filter orders. Therefore, the orders of the filter may be selected based on a minimum number of interfering base stations. In accordance with some embodiments, the orders of recursive filter 306 may be adaptively redistributed between main and interfering base stations in accordance to their relative importance and strength. For example, for 1×2 system with two interfering base stations, the channel state-space model may be represented by the following equation:

$$H_m(k+1) = H_m(k) + \dot{H}_m(k) + w_m(k)$$

$$H_{i1}(k+1) = H_{i1}(k) + w_{i1}(k)$$

$$H_{i2}(k+1) = H_{i2}(k) + w_{i2}(k) \quad (2)$$

where $H_m(k)$ represents the channel transfer function representing the channel estimate for the main channel for the $k^{th}$ symbol, $H_{i1}(k)$ represents the channel estimate for the first interfering channel for the $k^{th}$ symbol, and $H_{i2}(k)$ represents the channel estimate for the second interfering channel for the $k^{th}$ symbol. In Equation (2) w may represent the model noise, which may describe stochastic channel behaviour and may represent a discrepancy between the model and real channel dynamics. $\dot{H}_m$, read Hdot(k), represents the derivative of the channel transfer function and may be calculated from the expression $\dot{H}_m(k) = H(k) - H(k-1)$. In accordance with some embodiments, first and even higher-order derivatives may be used to describe smooth or rapidly changing channels.

In some embodiments, main channel 105 between base station 104 and mobile station 102 may be considered non-stationary because mobile station may be moving. In these embodiments, a higher-order model (e.g., higher than a first-order model) may be used for the state-space model of the channel. However, from an implementation point of view, the order of recursive filter 306, which may comprise the orders of the channel models of the main and interfering channels, may be a pre-determined value, although the scope of the invention is not limited in this respect.

In accordance with some embodiments, a generalized channel vector H for each antenna may be described by the following equation:

$$H(k) = \begin{bmatrix} H_m(k) \\ \dot{H}_m(k) \\ H_{i1}(k) \\ H_{i2}(k) \end{bmatrix} \quad (3)$$

From Equation (2) and (3), the channel state-space model may be rewritten in matrix form using a transition matrix F:

$$H(k+1) = F * H(k) + w(k) \quad (4)$$

or equivalent $$\begin{bmatrix} H_m(k+1) \\ \dot{H}_m(k+1) \\ H_{i1}(k+1) \\ H_{i2}(k+1) \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} * \begin{bmatrix} H_m(k) \\ \dot{H}_m(k) \\ H_{i1}(k) \\ H_{i2}(k) \end{bmatrix} + \begin{bmatrix} w_m(k) \\ 0 \\ w_{i1}(k) \\ w_{i2}(k) \end{bmatrix}.$$

In some embodiments, recursive filter 306 may use two orders (i.e., two dimensional vectors $H_m$ and $\dot{H}_m$) to track main channel and two orders to track channel of each interfering channel for a total of four orders. This may be viewed as a forth-order system. In some embodiments, when only one interfering base station is present, the orders of recursive filter 306 may be reallocated accordingly by filter initialization circuitry 304 to better track the more 'significant' interfering channel, although the scope of the invention is not limited in this respect.

In accordance with some embodiments, Equation (1) may represent the observation model and Equation (2) may represent the state-space model that may be used to construct recursive filter 306 for estimating the transfer functions of the main and interfering channels.

In some embodiments, symbol-by-symbol recursive filtering performed by recursive filter 306 may include the operations represented by the following equations to update the channel estimates for the main and interfering channels:

$$K(k) = V_H(k|k-1)p(k)[p(k)^T V_H(k|k-1)p(k) + V_n]^{-1} \quad (5)$$

which represents a gain update, $$H(k+1) = FH(k) + K(k)[x(j) - p(k)^T FH(k)] \quad (6)$$

which represents a channel estimate update, $$V_H(k) = [I - H(k)K(j)]V_H(k|k-1) \quad (7)$$

which represents an a-posteriori estimate covariance matrix for the current symbol, and $$V_H(k+1|k) = FV_H(k)F^T + V_w \quad (8)$$

which represents a prediction of an a-priori estimate of the covariance matrix for next symbol.

The initial conditions for recursive filter 306 may be set based on initial channel estimate H(0) that may be generated from preamble symbol 402 or alternatively may be taken from the previous frame. In the above equations, $V_H$ represents a priori estimate covariance, $V_n$ represents an observation additive noise covariance, $V_w$ represents signal model noise covariance, and F is a transition matrix. In some embodiments, $V_H$ may depend on the accuracy of the initial conditions. When the initial conditions are generated from the preamble symbol, $V_H$ may be set to a pre-defined value corresponding to the channel estimate variance. When the initial conditions are inherited from a previous frame for which recursive filtering was performed, the value of $V_H$ at the end of the previous frame may be used. In some embodiments, some correction may be applied. In some embodiments which utilize two receive antennas $V_n$ may be a 2×2 diagonal matrix with noise dispersion as the diagonal elements of the matrix. The noise dispersion may be determined from either known or measured input receiver noise.

After recursive filter 306 generates channel transfer functions 307 for main channel 105 and interfering channels 107 for the most significant interferers using Equations (5) thorough (8), weights calculation circuitry 308 may calculate the interference correlation matrix [$R_{in}$] from the channel transfer functions for interfering channels 107 and may apply an algorithm, such as a zero-forcing algorithm or MMSE algorithm, to generate weights for each pilot subcarrier for each antenna. In some embodiments, weights calculation circuitry 308 may apply the following equations to calculate the interference correlation matrix [$R_{in}$] and the weights [w] for each pilot subcarrier:

$$R_{in} = \sum_{i=1}^{N\_int} H_i^H H_i + I\sigma_n^2 \quad (9)$$

$$w = (H_m^H R_{in}^{-1} H_m)^{-1} H_m^H R_{in}^{-1} \quad (10)$$

In Equation (10), w represents a weight vector. Weights interpolation circuitry 310 may perform a linear interpolation on the weights generated by weights calculation circuitry 308 to generate weights for each data subcarrier for each antenna of the current data symbol. The weights generated by weights calculation circuitry 308 may be in the form of a weight vector. Combiner 222 may apply the weight vector generated by weights calculation circuitry 308 to the received signal at a particular subcarrier for the current data symbol to mitigate interference.

Because frequency domain signals 207A and 207B (FIG. 3) are received by separate antennas, slight differences between frequency domain signals 207A and 207B may result because of the differing channel characteristics between antenna 103A and base stations 104, 106, and antenna 103B and base stations 104, 106. Recursive filter 306 exploits these slight differences between frequency domain signals 207A and 207B allowing combiner 222 to perform an optimal combining technique, such as the ZF and MMSE optimal combining techniques discussed above.

In some embodiments, channel estimator 220 may take advantage of the difference in phase shift between the signals received by antennas 203A and 203B from serving base station 102 and the signals received by antennas 203A and 203B from interfering base stations 106. For example, when antennas 203A and 203B are omnidirectional antennas, the phase shift of the signals received from serving base station 102 between antennas 203A and 203B will be different than the phase shift of the signals received from one of the interfering base station 106. This is because the direction to serving base station 102 may be different than the direction to an interfering base station. The different directions result in different phase shifts of signals received by antennas 203A and 203B. In other words, signals received from serving base station 102 will have one phase shift, and the signals from each interfering base station 106 will have different phase shifts. Based on these different phase shifts, as well as other parameters described above, channel estimator 220 may generate weights that may cancel the interfering signals.

In some embodiments in which two receive antennas are used (i.e., antennas 203A and 203B), channel estimator 220 may generate weights to almost completely cancel interference from one interfering base station and at least partially cancel interference from other interfering base stations arriving from different directions. In some embodiments in which three receive antennas are used, channel estimator 220 may generate weights to completely cancel interference from two interfering base stations arriving from different directions. In some embodiments, when an adaptive array of receive antennas is used with N elements, channel estimator 220 may generate weights to cancel interference from N-1 interfering base stations arriving from different directions. In these embodiments, the number of elements N may range from as little as two to as great a ten or more.

Figure 5:
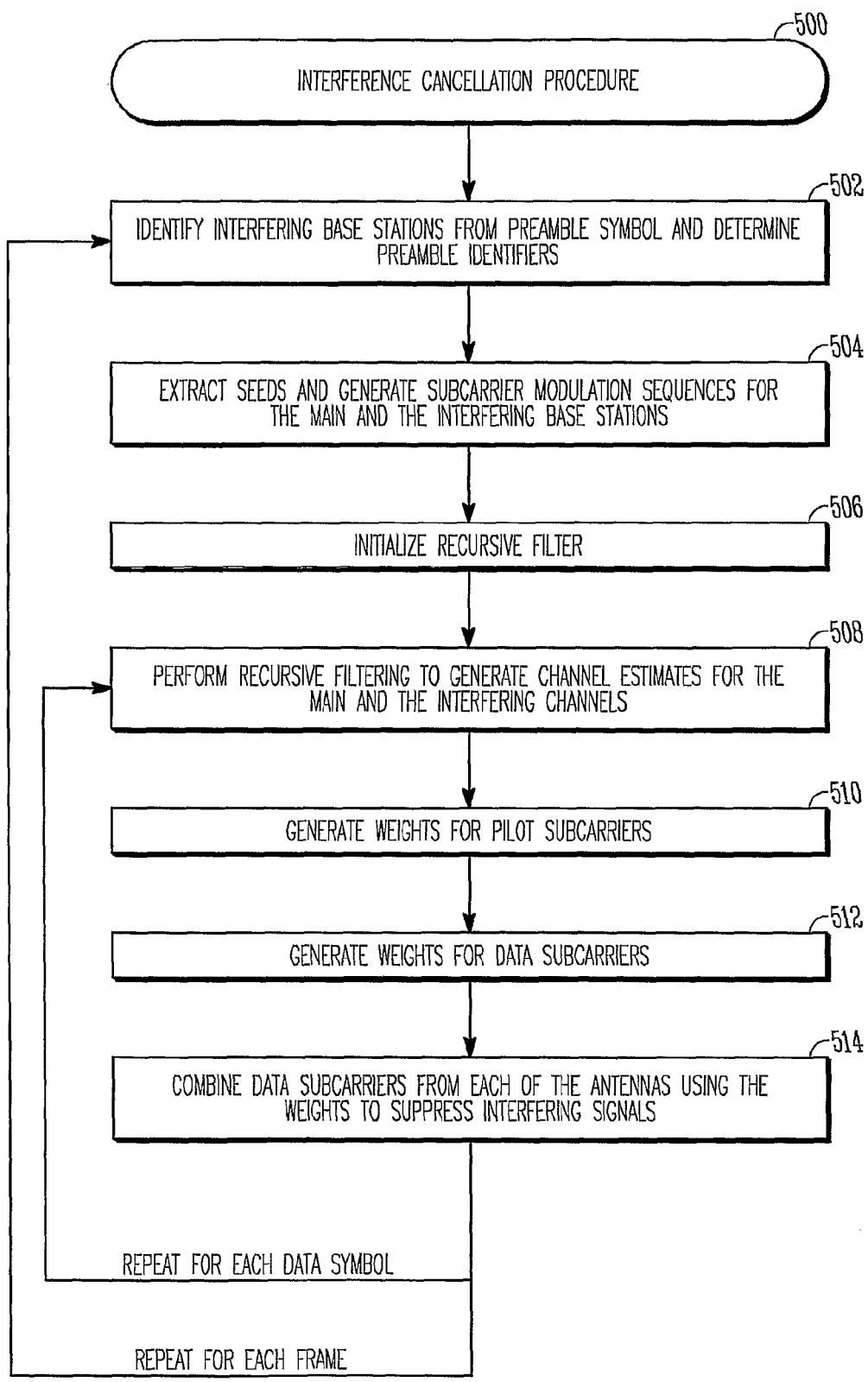
FIG. 5 is a flow chart of an interference cancellation procedure in accordance with some embodiments of the present invention.

FIG. 5 is a flow chart of an interference cancellation procedure in accordance with some embodiments of the present invention. Interference cancellation procedure 500 may generate and apply weights to signals received through two or more antennas of a mobile station, such as mobile station 102 (FIG. 1A), to significantly decrease and even substantially cancel the interference from one or more interfering base stations, such as interfering base stations 106 (FIG. 1A). In some embodiments, interference cancellation procedure 500 may be performed by a channel estimator, such as channel estimator 220 (FIG. 2), to generate the weights, and a combiner, such as combiner 222 (FIG. 2), to apply the weights, although other devices may be used to perform procedure 500.

In operation 502, interfering base stations are identified from a received preamble symbol. In some embodiments, the preamble identifiers for the interfering base stations are determined from the preamble symbol. In some embodiments, the interfering base stations are identified from the preamble symbol and the most significant interfering base stations are identified. In some embodiments, the two most significant interfering base stations are identified, although the scope of the invention is not limited in this respect. In some embodiments, the preamble identifier for the serving base station may also be determined. In some embodiments, operation 502 may also include determining an initial channel estimate for the main channel from the preamble symbol. In some multi-sector embodiments, operation 502 may also include determining an initial channel estimate from interfering channels of a multi-sector base station from the preamble symbol. In some embodiments, operation 502 may be performed by preamble symbol processing circuitry 302 (FIG. 3), although the scope of the invention is not limited in this respect.

Operation 504 comprises extracting seeds from the preamble identifiers for the serving base station and the interfering base stations and generating subcarrier modulation sequences from the extracted seeds. In some embodiments, operation 504 may be performed by preamble symbol processing circuitry 302 (FIG. 3) and/or filter initialization circuitry 304 (FIG. 3), although the scope of the invention is not limited in this respect.

Operation 506 comprises initializing a recursive filter. In some embodiments, operation 506 includes initializing the recursive filter with the initial channel estimates in accordance with the state-space model discussed above. In some embodiments, operation 506 may be performed by filter initialization circuitry 304 (FIG. 3), although the scope of the invention is not limited in this respect.

Operation 508 comprises performing recursive filtering to generate and update the channel estimates for the main channel and the interfering channels. In some embodiments, recursive filter 306 (FIG. 3) may perform operation 508 to recursively generate channel estimates 307 (FIG. 3) for main channel 105 (FIG. 1A) and interfering channels 107 (FIG. 2) for each pilot subcarrier. In some embodiments, operation 508 may use pilot subcarrier modulation sequences for both serving base station 102 (FIG. 1A) and interfering base stations 106 (FIG. 1A) as well as the signals received on pilot subcarriers 326 (FIG. 3) through each of the antennas. In some embodiments, recursive filter 306 (FIG. 3) may perform operation 508 using Equations (5) through (8), although the scope of the invention is not limited in this respect.

Operation 510 comprises generating weights for the pilot subcarriers. In some embodiments, operation 510 may comprise calculating an interference correlation matrix for each pilot subcarrier from the channel estimates for interfering channels 107 (FIG. 1A) using Equation (9). Operation 510 may also comprise calculating pilot-subcarrier weights 309 (FIG. 3) for each pilot subcarrier for each of antennas 203A and 203B (FIG. 2) based on the interference correlation matrix and the channel estimate for main channel 107 (FIG. 1A) using equation (10). In some embodiments, operation 510 may be performed by weights calculation circuitry 308 (FIG. 3), although the scope of the invention is not limited in this respect.

In operation 512, the weights for data subcarriers may be generated by interpolating the weights generated from the pilot subcarriers in operation 510. In some embodiments, operation 512 generates data-subcarrier weights 221 (FIG. 2) for each data subcarrier for each of antennas 203A and 203B (FIG. 2). In some embodiments, operation 512 may be performed by weights interpolation circuitry 310 (FIG. 3), although the scope of the invention is not limited in this respect.

In operation 514, the weights for the data subcarriers generated in operation 512 may be applied to the signals received through two or more antennas to suppress the interfering signals. In some embodiments, operation 514 may be performed by combiner 222 (FIG. 2), although the scope of the invention is not limited in this respect.

In some embodiments, operations 508, 510, 512 and 514 may be performed on a symbol-by-symbol basis for each data symbol of a received OFDMA frame, although the scope of the invention is not limited in this respect. In some embodiments, operations 502, 504, 506, 508, 510, 512 and 514 may be performed on a frame-by-frame basis for each OFDMA frame received by a mobile station. Although the individual operations of procedure 500 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A mobile station that operates in presence of one or more interfering base stations comprising: a preamble symbol processing circuitry configured to identify one or more interfering base stations from a received preamble symbol; a recursive filter circuitry configured to perform a recursive filtering process using pilot subcarrier modulation sequences on pilot subcarriers of orthogonal frequency division multiple access (OFDMA) data symbols received through two or more antennas to update channel estimates on a symbol-by-symbol basis for a main channel associated with a serving base station and one or more interfering channels associated with the one or more interfering base stations for use in mitigating interference from the interfering base stations, wherein the recursive filter updates the channel estimates for the main channel and the one or more interfering channels on the symbol-by-symbol basis based on a state-space dynamic model of a channel transfer function for the main and interfering channels using signals received on the pilot subcarriers and the subcarrier modulation sequences for the main and interfering channels; and a filter initialization circuitry configured to generate the pilot subcarrier modulation sequences for the main channel and the one or more interfering channels based on seeds extracted from preamble identifiers transmitted by the serving base station and the one or more interfering base stations respectively, the recursive filter being initialized with channel estimates generated from the pilot subcarrier initialized with channel estimates generated from the pilot subcarrier modulation sequences, wherein the serving base station and the one or more interfering base stations use different pilot subcarrier modulation sequences for modulation of their pilot subcarriers.

2. The mobile station of claim 1 further comprising weights calculation and interpolation circuitry to generate weights fur subsequent application to each of a plurality of data subcarriers of the data symbols received through the two or more antennas,
wherein the weights calculation and interpolation circuitry calculates an interference correlation matrix from the channel estimates for the interfering channels,
wherein the weights calculation and interpolation circuitry generates the weights from the channel estimate for the main channel and the interference correlation matrix, and
wherein the weights comprise a weight for each data subcarrier for signals received through the two or more antennas.

3. The mobile station of claim 2 wherein the preamble symbol is transmitted from the serving base station through the main channel and is received through the two or more antennas, wherein the preamble symbol comprises substantially time-synchronized transmissions by the serving base station on a predetermined set of subcarriers and interfering transmissions by the one or more interfering base station on the predetermined set of subcarriers, and wherein the filter initialization circuitry is arranged to generate the subcarrier modulation sequences for the main channel and the one or more interfering channels for use by the recursive filter in updating the channel estimates.

4. The mobile station of claim 3, wherein the weight calculation and interpolation circuitry calculates an interference correlation matrix, on a symbol-by-symbol basis, from the channel estimates of the interfering channels, and wherein the weight calculation and interpolation circuitry calculates weights for the pilot subcarriers, on a symbol-by-symbol basis, from the interference correlation matrix and the channel estimate for the main channel.

5. The mobile station of claim 3 wherein the filter initialization circuitry initializes the recursive filter with an initial channel estimate for the main channel generated by the preamble symbol processing circuitry using the pilot subcarrier modulation sequences, wherein the filter initialization circuitry selects orders for the recursive filter based on a number of interfering base stations identified by the preamble symbol processing circuitry, and wherein the filter initialization circuitry adaptively updates the orders of the recursive filter when the number of interfering base stations changes.

6. The mobile station of claim 1 wherein the preamble symbol is received through the two or more antennas, wherein the preamble symbol processing circuitry combines frequency-domain signals associated with each of the antennas, and wherein the preamble symbol processing circuitry performs frequency-domain matched filtering to separate preamble symbols transmitted by the one or more interfering base stations from a preamble symbol transmitted by the serving base station.

7. The mobile station of claim 3 wherein the preamble symbol processing circuitry determines a preamble identifier for the serving base station from the preamble symbol. and a preamble identifier for the one or more interfering base stations, wherein the preamble symbol processing circuitry further extracts a seed for the serving base station from the preamble identifier of the serving base station, wherein the preamble symbol processing circuitry further extracts one or more seeds for the one or more interfering base stations from the preamble identifier of the one or more interfering base stations, and wherein the filter initialization circuitry generates the subcarrier modulation sequence for the main channel from the seed for the serving base station and generates the one or more subcarrier modulation sequences for the one or more interfering channels from the one or more seeds for the one or more interfering base station.

8. The mobile station of claim 3 wherein the one or more interfering base stations and the serving base station operate substantially synchronously baying substantially synchronized OFDMA downlink time slots, and wherein the preamble symbol is an OFDMA downlink preamble symbol of an OFDMA frame received by the mobile station from the serving base station and the one or more interfering base stations.

9. The mobile station of claim 3 wherein the weights calculation and interpolation circuitry comprises:

weight calculation circuitry to calculate the interference correlation matrix from the channel estimates for the interfering channels and to generate pilot-subcarrier weights for each of the pilot subcarriers from the channel estimate for the main channel and the interference correlation matrix; and weights interpolation circuitry to perform a linear interpolation on the pilot-subcarrier weights to generate data-subcarrier weights for the data subcarriers for each of the two or more antennas.

10. The mobile station of claim 9 further comprising a combiner to apply the data-subcarrier weights to data subcarriers received through the two or more antennas to generate one set of symbols for the data subcarriers.

11. A method for reducing interference from one or more interfering base stations comprising: identifying one or more interfering base stations from a received preamble symbol; performing a recursive filtering process using pilot subcarrier modulation sequences on pilot subcarrier of orthogonal frequency division multiple access (OFDMA) data symbols received through two or more antennas to update channel estimates on a symbol-by-symbol basis for a main channel associated with a serving base station and one or more interfering channels associated with the one or more interfering base stations for use in mitigating interference from the interfering base stations, wherein performing the recursive filtering comprises updating the channel estimates for the main channel and the one or more interfering channels on the symbol-by-symbol basis based on a state-space dynamic model of a channel transfer function for the main and interfering channels using signals received on the pilot subcarriers and the subcarrier modulation sequences for the main and interfering channels; generating the pilot subcarrier modulation sequences for the main channel and the one or more interfering channel based on seeds extracted from preamble identifiers transmitted by the serving base station and the one or more interfering base stations, respectively; and initializing the recursive filtering process with channel estimates generated from the pilot subcarrier modulation sequences, wherein the serving base station and the one or more interfering base stations use different pilot subcarrier modulation sequences for modulation of their pilot subcarriers.

12. method of claim 11 further comprising:

generating weights for subsequent application to each of a plurality of data subcarriers of the data symbols received through the two or more antennas;

calculating an interference correlation matrix from the channel estimates for the interfering channels; and generating the weights from the channel estimate for the main channel and the interference correlation matrix, the weights comprising a weight for each data subcarrier received through the two or more antennas.

13. The method of claim 12 wherein the preamble symbol is transmitted from the serving base station through the main channel and is received through the two or more antennas, wherein the preamble symbol comprises substantially time-synchronized transmissions by the serving base station on a predetermined set of subcarriers and interfering transmissions by the one or more interfering base station on the predetermined set of subcarriers, and wherein the method further comprises generating the subcarrier modulation sequences for the main channel and the one or more interfering channels for use in performing the recursive filtering to generate and update the channel estimates.

14. The method of claim 13 wherein the method further comprises: calculating an interference correlation matrix, on a symbol-by-symbol basis, from the channel estimates of the interfering channels; and calculating weights for the pilot subcarriers, on a symbol-by-symbol basis, from the interference correlation matrix and the channel estimate for the main channel.

15. The method of claim 13 further comprising:

initializing the recursive filtering process with an initial channel estimate for the main channel generated from the pilot subcarrier modulation sequences;

selecting orders for the recursive filtering process based on a number of interfering base stations identified; and adaptively updating the orders for the recursive filtering process when the number of interfering base stations changes.

16. The method of claim 11 wherein the preamble symbol is received through the two or more antennas, and wherein the method further comprises:

combining frequency-domain signals associated with each of the antennas; and performing frequency-domain matched filtering to separate preamble symbols transmitted by the one or more interfering base stations from a preamble symbol transmitted by the serving base station.

17. The method of claim 13 further comprising:
determining a preamble identifier for the serving base station from the preamble symbol and a preamble identifier for the one or more interfering base stations;
extracting a seed for the serving base station from the preamble identifier of the serving base station;
extracting one or more seeds for the one or more interfering base stations from the preamble identifier of the one or more interfering base stations;
generating the subcarrier modulation sequence for the main channel from the seed for the serving base station; and
generating the one or more subcarrier modulation sequences for the one or more interfering channels from the one or more seeds for the one or more interfering base station.

18. The method of claim 13 wherein the one or more interfering base stations and the serving base station operate substantially synchronously having substantially synchronized OFDMA downlink time slots, and wherein the preamble symbol is an OFDMA downlink preamble symbol of an OFDMA frame received by the mobile station from the serving base station and the one or more interfering base stations.

19. The method of claim 13 wherein the interference correlation matrix is calculated from the channel estimates for the interfering channels and to generate pilot-subcarrier weights for each of the pilot subcarriers from the channel estimate for the main channel and the interference correlation matrix, and
wherein the method further comprises performing a linear interpolation on the pilot-subcarrier weights to generate data-subcarrier weights for the data subcarriers for each of the two or more antennas.

20. The method of claim 19 further comprising applying the data-subcarrier weights to data subcarriers received through the two or more antennas to generate one set of symbols for the data subcarriers.

21. A non-transitory computer-readable storage medium that stores instructions for execution by one or more processors to perform operations for reducing interference from one or more interfering base stations, the operations comprising: identifying one or more interfering base stations from a received preamble symbol; performing a recursive filtering process using pilot subcarrier modulation sequences on pilot subcarriers of orthogonal frequency division multiple access (OFDMA) data symbols received through two or more antennas to update channel estimates on a symbol-by-symbol basis for a main channel associated with a serving base station and one or more interfering channels associated with the one or more interfering base stations for use in mitigating interference from the interfering base stations, wherein performing the recursive filtering comprises updating the channel estimates for the main channel and the one or more interfering channels on the symbol-by-symbol basis based on a state-space dynamic model of a channel transfer function for the main and interfering channels using signals received on the pilot subcarriers and the subcarrier modulation sequences for the main and interfering channels; generating the pilot subcarrier modulation sequences for the main channel and the one or more interfering channels based on seeds extracted from preamble identifiers transmitted by the serving base station and the one or more interfering base stations, respectively; and initializing the recursive filtering process with channel estimates generated from the pilot subcarrier modulation sequences, wherein the serving base station and the one or more interfering base stations use different pilot subcarrier modulation sequences for modulation of their pilot subcarriers.

* * * * *

UNITED STATES PATENT AND TRADEMARK OFFICE
CERTIFICATE OF CORRECTION

| | | |
|---|---|---|
| PATENT NO. | : 8,804,884 B2 | Page 1 of 1 |
| APPLICATION NO. | : 12/278368 | |
| DATED | : August 12, 2014 | |
| INVENTOR(S) | : Maltsev et al. | |

It is certified that error appears in the above-identified patent and that said Letters Patent is hereby corrected as shown below:

In the Claims

In column 14, line 31, in Claim 2, delete "fur" and insert --for--, therefor

In column 15, line 23, in Claim 7, after "symbol", delete ".", therefor

In column 15, line 41, in Claim 8, delete "baying" and insert --having--, therefor In column 16, line 24, in Claim 12, before "method", insert --The--, therefor Signed and Sealed this
Sixteenth Day of December, 2014

Michelle K. Lee
*Deputy Director of the United States Patent and Trademark Office*